United States Patent [19]

Konkler

[11] 4,162,112
[45] Jul. 24, 1979

[54] STORAGE ASSEMBLY FOR A TAPE MAGAZINE

[75] Inventor: Anthony W. Konkler, Lakeland, Minn.

[73] Assignee: Minnesota Mining and Manufacturing Company, St. Paul, Minn.

[21] Appl. No.: 871,174

[22] Filed: Jan. 23, 1978

[51] Int. Cl.² .............................................. A47B 81/06
[52] U.S. Cl. ........................................ 312/15; 312/18; 206/387
[58] Field of Search ....................... 312/15, 16, 17, 18, 312/19, 20, 10; 206/387

[56] References Cited

U.S. PATENT DOCUMENTS

| | | | |
|---|---|---|---|
| 1,302,943 | 5/1919 | McVay | 312/15 |
| 1,393,065 | 10/1921 | Young | 312/15 |
| 1,440,873 | 1/1923 | Hammond | 312/17 |
| 2,330,173 | 9/1943 | Gordon, Jr. et al. | 312/15 |
| 3,779,621 | 12/1973 | Carless | 312/15 |
| 3,866,990 | 2/1975 | McRae | 312/15 |
| 3,969,007 | 7/1976 | Lowry | 312/15 |
| 3,995,737 | 12/1976 | Ackeret | 312/15 |

Primary Examiner—Victor N. Sakran
Attorney, Agent, or Firm—Cruzan Alexander; Donald M. Sell; William L. Huebsch

[57] ABSTRACT

A storage assembly comprising a housing having a socket adapted to receive a tape magazine, and an integrally formed polymeric lever member which may be manually manipulated to partially eject the magazine from the socket. The lever member includes a first stiff portion mounted for reciprocal motion along one side of the socket so that its end may be pressed adjacent the open end of the socket to operate the lever member; a second stiff portion pivotably mounted adjacent the rear wall of the housing; and a resilient flexible portion connecting the portions which both causes the second portion to pivot to a position at which it will partially eject the magazine when the first portion is pressed inwardly, and biases both portions to a normal position at which a magazine may be positioned fully within the socket.

5 Claims, 3 Drawing Figures

STORAGE ASSEMBLY FOR A TAPE MAGAZINE

BACKGROUND OF THE INVENTION

This invention relates to storage assemblies having sockets for receiving tape magazines and including manually operated lever means for at least partially ejecting the tape magazines from the sockets.

The art is replete with storage assemblies for tape magazines (e.g., such as Phillips type cassettes, endless loop cartridges, or reels of tape) which include a housing having a socket in which the tape magazines may be received, and manually operated lever means for partially ejecting the tape magazines from the sockets to a portion where they may be manually engaged.

Typical are those described in U.S. Pat. Nos. 2,330,173, 2,674,507, 3,582,168, 3,779,621, 3,866,990, and 3,969,007.

In all known devices of this type in which the lever means are accessible from adjacent the opening to the socket, however, the lever means consist of a plurality of separate portions pivotably or slidably mounted on the housing. Also, most include a separate means for biasing the lever means to a normal position at which the tape magazine can be positioned fully within the socket, all of which adds to the expense of the storage assembly.

SUMMARY OF THE INVENTION

According to the present invention there is provided a storage assembly for receiving a tape magazine which storage assembly includes a housing, a manually operated lever means for partially ejecting the tape magazine, and means for biasing the lever means to a normal position wherein the lever means has a novel one piece structure which is both inexpensive to make and easy to assemble into the housing, and also provides the biasing means.

The storage assembly is of the type in which the housing includes rectangularly disposed side, end and rear walls defining a socket having an open side adapted to receive a tape magazine; and the lever means comprises a first stiff elongate portion having a manually engageable end, means mounting the first elongate portion adjacent and parallel to the end walls with the manually engageable end adjacent the open end of the socket for reciprocal motion between a normal position with the manually engageable end outermost and an eject position with the manually engageable end innermost, a second stiff elongate portion having an engaging end adapted to engage the innermost side of a tape magazine within the socket, means mounting the second elongate portion in a position along the rear wall for pivotable movement from a normal position with the engaging end adjacent the rear wall and an eject position with the engaging end projecting into the socket to partially displace a cartridge therein; means for providing engagement between the portions to move the second elongate portion from its normal to its eject position upon manual movement of the first portion from its normal to its eject position, and means for biasing the first and second elongate portions to their normal positions.

The storage assembly according to the present invention, however, is improved and simplified in that both the first and second portions of its lever means are provided by a one piece integral member of elastic resilient polymeric material, which member has a thin flexible portion connecting the first and second portions and providing both the means for providing engagement between the stiff first and second portions and the means for biasing the first and second portions to their normal positions.

BRIEF DESCRIPTION OF THE DRAWING

The present invention will be further described with reference to the accompanying drawing wherein like reference numerals refer to like parts in the several figures and wherein.

DESCRIPTION OF THE PREFERRED EMBODIMENT

Figures 2, 3:
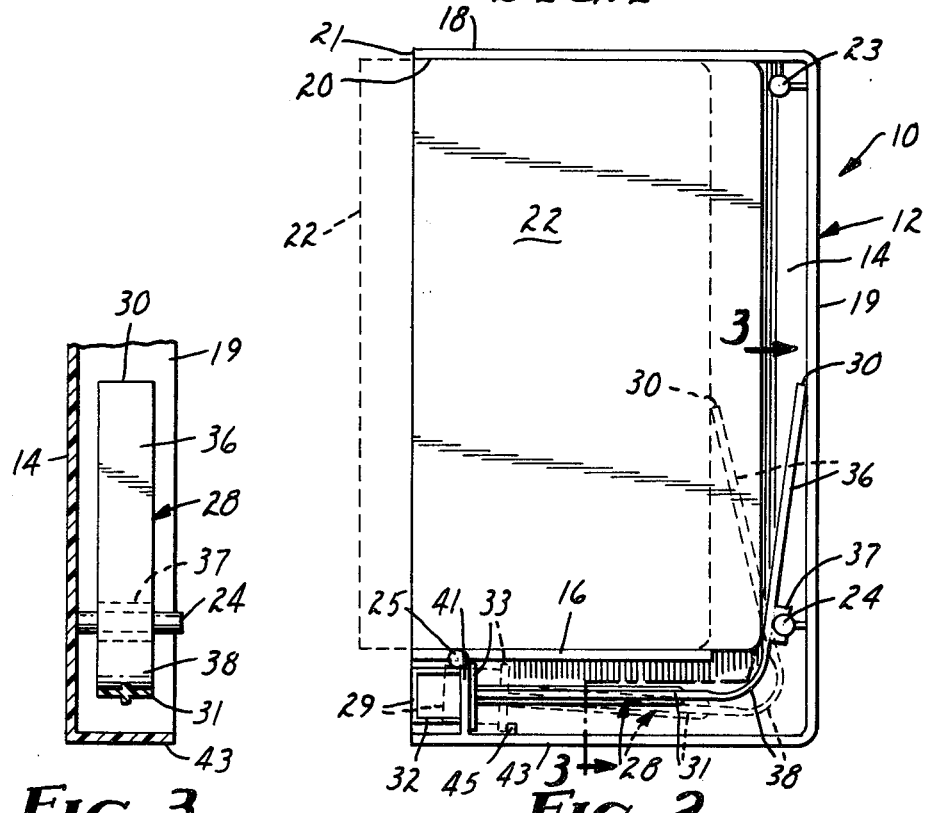
FIG. 2 is a side view of one of the storage assemblies of FIG. 1 taken approximately along the line 2—2 of FIG. 1.
FIG. 3 is a fragmentary sectional view taken generally along the line 3—3 of FIG. 2.

Referring now to FIG. 2 of the drawing there is shown a storage assembly according to the present invention generally designated by the reference numeral 10.

The storage assembly 10 includes a housing 12 comprising a side wall 14, and two end walls 16 and 18 and a rear wall 19 projecting at right angles to the side wall 14 and being rectangularly disposed with respect to the side wall 14 to define a socket 20 having an open side 21. The socket 20 is adapted to slidably receive a tape magazine (such as a Beta format video cassette 22 as illustrated) through its open side 21.

Figure 1:
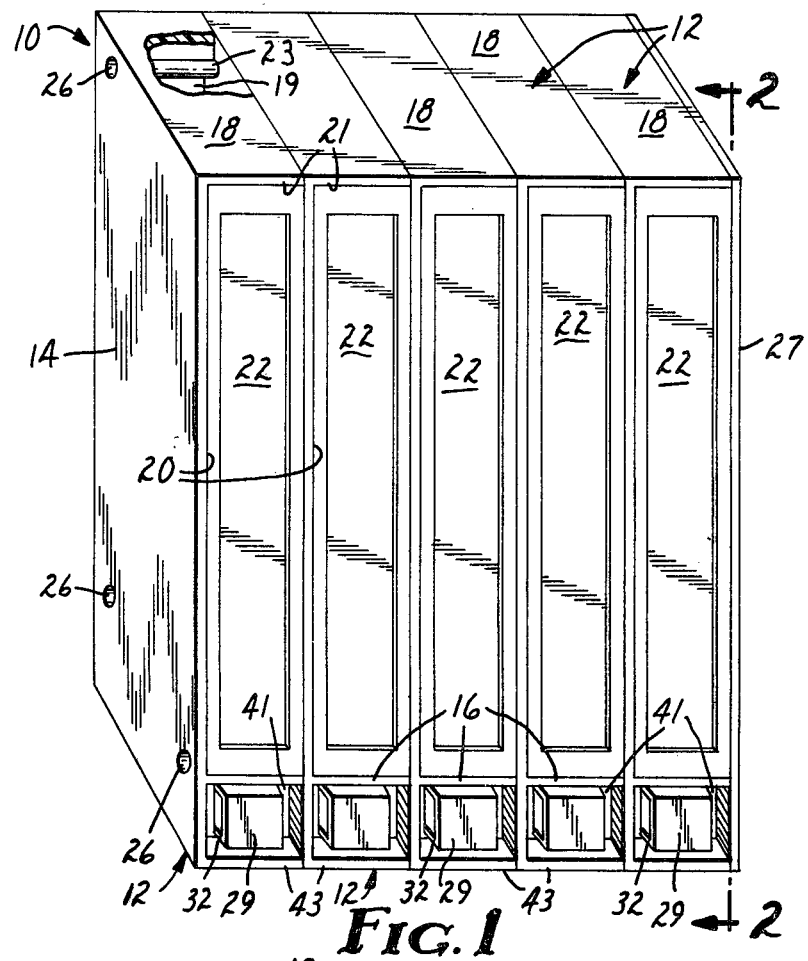
FIG. 1 is a perspective view of a plurality of storage assemblies according to the present invention having a part of one broken away to show detail.

The housing 12 includes a plurality of pegs 23, 24, and 25 having ends projecting above the distal edges of the end and rear walls 16, 18, and 19. Also the housing 12 has a plurality of openings 26 in the side wall 14 at the base of the pegs 23, 24, and 25 and opening from the surface of the side wall 14 opposite the end and rear walls 16, 18 and 19. The openings 26 are adapted to frictionally receive the ends of the pegs 23, 24, and 25 in another housing 12 as illustrated in FIG. 1 so that when the housings 12 are assembled side by side the side wall 14 of each housing 12 with which pegs 23, 24 and 25 of another housing member are engaged will provide a side wall for both sockets 20 adjacent its major surfaces. As illustrated in FIG. 1, a rectangular plate-like member 27 having sockets spaced to frictionally receive the ends of the pegs 23, 24, and 25 may be placed over the open side of one end housing 12 to make it usable.

Also included in the storage assembly 10 are lever means for ejecting the cassette from the socket 20 comprising a one piece integral lever member 28 of stiff resilient polymeric material (such as acetal), and means for mounting the lever member 28 on the housing 12 so that movement of the lever member 28 by finger pressure against a manually engageable end 29 thereof will cause an opposite engaging end 30 of the lever member 28 to push the cassette partially out of the socket 20.

The one piece integral lever member 28 includes a first elongate stiff portion including an elongate thin ribbed blade-like part 31 and a generally rectangular end part 32 with a flange 33 extending around its surface adjacent the blade-like part 31; and a second elongate stiff portion comprising a blade-like part 36 and a channel-like part 37 which extends transverse of the blade-like part 36. The blade-like parts 31 and 36 are joined at their ends by a thin flexible resilient portion 38 which, when unstressed, positions the blade-like parts 31 and 36 at an included angle of about 90 degrees or greater.

The means for mounting the lever member 28 on the housing 12 comprises the peg 24 which is integrally molded with the housing 12 adjacent the rear wall 19 and normal to the side wall 14. The peg 24 has an arcuate surface portion on its side opposite the rear wall 19 around which is positioned the channel-like part 37 of the lever member 28 to both position its second portion and allow it to be pivotably moved with respect to the housing 12. Also included is a guide wall 41 included in the housing 12 and extending between the end wall 16 and an outer wall 43. The guide wall 41 is generally parallel to the rear wall 19 and projects from the side wall 14, and with the outer wall 43 is an integral part of the housing 12.

The guide wall 41 has a rectangular opening which freely receives and guides the rectangular end part 32 of the lever member 28, but will not pass its flange 33. The lever member 28 is retained in the housing 12 by opposing engagement of the channel-like part 37 against the peg 24 and abutment of the flange 33 against the guide wall 41 on its side adjacent the rear wall 19, with the thin portion 38 of the lever member 28 being bent slightly to bias their engaging surfaces together. These engagements provide means both for mounting the lever member 28 in the housing 12 with the manually engageable end 29 adjacent the open side 21 of the socket 20, the first portion of the lever member 28 adjacent and generally parallel to the end walls 16 and 18, and the second portion of the lever member 28 along and somewhat parallel to the rear wall 19; and for affording reciprocal and pivotal movement respectively for the first and second portions of the lever member 28 via bending of the resilient portion 38 between a normal position (shown in solid outline in FIG. 2) with its end 29 outermost and its engaging end 30 spaced from a tape magazine in the socket 20 and positioned adjacent the rear wall 19, and an eject position defined by engagement between the flange 33 and a stop 45 on the housing 12 (shown in dotted outline in FIG. 2) with its manually engageable end 29 innermost and its engaging end 30 projecting into the socket 20 to displace a tape magazine therein. The additional resilient flexing of the thin portion 38 caused as the lever member 28 moves from its normal toward its eject position provides means for biasing the lever member 28 so that it will return to its normal position after manual pressure is no longer applied to its end 29.

I claim:

1. In a storage assembly for a tape magazine comprising a housing including rectangularly disposed side, end and rear walls defining a socket having an open side adapted to slidably receive a said magazine, and means for ejecting a said magazine comprising a first stiff elongate portion having a manually engageable end, means mounting said first elongate portion adjacent and parallel to said end walls with said manually engageable end adjacent the open end of said socket for reciprocal motion between a normal position with said manually engageable end outermost and an eject position with said manually engageable end innermost, a second stiff elongate portion having an engaging end adapted to engage the innermost side of a said magazine within said socket, means mounting said second elongate portion in a position along said rear wall for pivotal motion from a normal position with said engaging end adjacent said rear wall and an eject position with said engaging end projecting into said socket to partially displace a magazine therein; means for providing engagement between said portions to move said second elongate portion from said normal to said eject position upon manual movement of said first portion from said normal to said eject positions, and means for biasing said first and second elongate portions to their normal positions, the improvement, wherein:

said first and second stiff portions are included in a one piece integral member of elastic resilient polymeric material, said member also having a relatively thin flexible portion connecting said first and second portions and providing both said means for providing engagement and said means for biasing.

2. A storage assembly according to claim 1 wherein said means mounting said second elongate portion for pivotal movement comprises a peg fixed to said housing adjacent said rear wall and normal to said side wall, said peg having an arcuate surface portion on its side opposite the rear wall, and a channel-like part of said second portion transverse of said second portion and engaged over the arcuate surface of said pin, with said means for biasing maintaining said channel-like portion in engagement with said pin.

3. A tape magazine storage assembly including a housing member comprising end walls, a rear wall and a side wall rectangularly disposed to partially define a socket having an open side adapted to slidably receive a said tape magazine; and means for ejecting a said tape magazine comprising:
a one piece integral lever member of stiff elastic resilient polymeric material, including a first elongate stiff portion having a manually engageable end and an opposite second end, a second elongate stiff portion having an engaging end adapted to engage the innermost side of a said tape magazine within said socket and an opposite second end, and a thin flexible resilient portion connecting the second ends of said first and second portions; and means for mounting said lever member in said housing member with said manually engageable end adjacent the open end of said socket and said first portion adjacent and generally parallel to said end walls, and said second portion along said rear wall; and for affording reciprocal movement of said first portion and corresponding pivotal movement of said second portion from a normal position with said manually engageable end outermost and said engaging end adjacent said rear wall, and an eject position with said manually engageable end innermost and said engaging end projecting into said socket to displace a tape magazine.

4. A tape magazine storage assembly according to claim 3 wherein said housing includes pegs having ends projecting above the distal edges of said end and rear walls, and said side wall has openings adapted to frictionally receive the pegs of another of said storage assemblies.

5. A tape magazine storage assembly according to claim 3 wherein said means for mounting comprises a peg fixed to said housing adjacent said rear wall and normal to said side walls, said peg having an arcuate surface portion on its side opposite the rear wall; a channel-like part of said second portion engaged over the arcuate surface of said pin; a guide wall included in said housing guiding the first portion of said lever member adjacent said manually engageable end; and abutment means adapted for engagement between said guide wall and said first portion of said lever member to help define the normal position of said lever member, the thin flexible portion of said lever member being deflected when said lever member is in its normal position and providing means for biasing said peg and channel-like part and said abutment means into engagement.

* * * * *